(12) United States Patent
Fischer

(10) Patent No.: US 10,555,606 B2
(45) Date of Patent: Feb. 11, 2020

(54) STAND FOR HOLDING BOTTLES UPSIDE DOWN

(71) Applicant: Diane Fischer, Madera, CA (US)

(72) Inventor: Diane Fischer, Madera, CA (US)

( * ) Notice: Subject to any disclaimer, the term of this patent is extended or adjusted under 35 U.S.C. 154(b) by 0 days.

(21) Appl. No.: 15/942,225

(22) Filed: Mar. 30, 2018

(65) Prior Publication Data

US 2018/0289152 A1  Oct. 11, 2018

Related U.S. Application Data

(60) Provisional application No. 62/478,902, filed on Mar. 30, 2017.

(51) Int. Cl.
*A47B 73/00* (2006.01)
*A47J 47/16* (2006.01)

(52) U.S. Cl.
CPC .......... *A47B 73/004* (2013.01); *A47B 73/002* (2013.01); *A47J 47/16* (2013.01)

(58) Field of Classification Search
CPC ...... A47B 73/004; A47B 73/002; A47J 47/16; A47F 5/01; A47G 23/0241
USPC .......................................................... 211/74
See application file for complete search history.

(56) References Cited

U.S. PATENT DOCUMENTS

| | | | | |
|---|---|---|---|---|
| 1,514,375 A | * | 11/1924 | Crimmel | A47J 47/16 211/181.1 |
| 1,858,299 A | * | 5/1932 | Korn | A47G 23/0208 211/74 |
| 1,947,932 A | * | 2/1934 | Fante | A23G 9/288 141/246 |
| 1,992,411 A | * | 2/1935 | Bruce | B65D 85/305 206/202 |
| 2,051,091 A | * | 8/1936 | Ladewig | B08B 9/423 198/803.15 |
| 2,419,040 A | * | 4/1947 | Stepanian | A47L 19/04 211/74 |
| 2,527,796 A | * | 10/1950 | Clute | A47B 73/002 211/74 |
| 2,672,988 A | * | 3/1954 | Johnson | B60N 3/007 108/46 |
| 2,925,235 A | * | 2/1960 | Jaros | A47G 23/0241 248/153 |
| D188,332 S | * | 7/1960 | Martin | D6/562 |
| 3,181,702 A | * | 5/1965 | Raphaei | A47K 3/281 211/119 |
| 3,391,891 A | * | 7/1968 | Garden | B60N 3/102 108/135 |
| 3,589,338 A | * | 6/1971 | Lovitz | A01K 1/0356 119/51.01 |

(Continued)

OTHER PUBLICATIONS

Flip-It! Cap System_Bottle Emptying Kit_Get Every Drop, 2015, https://flipitcap.com/.

*Primary Examiner* — Patrick D Hawn
(74) *Attorney, Agent, or Firm* — Jared E. Christensen; Sierra IP Law, PC

(57) ABSTRACT

A stand for supporting product containers, such as bottles, in an inverted or upside-down position, allowing the content of the bottle to settle near the opening, reducing product waste, the stand having an aesthetically pleasing appearance so as to be useful in any area of the home. The stand may comprise a frame, at least one foot, and at least one bottle or container support.

12 Claims, 13 Drawing Sheets

(56) References Cited

U.S. PATENT DOCUMENTS

| | | | | |
|---|---|---|---|---|
| 3,789,996 A * | 2/1974 | Stroh | A47K 1/09 | 211/106 |
| 3,858,835 A * | 1/1975 | Baren | B01L 9/00 | 211/181.1 |
| 3,955,682 A * | 5/1976 | Baren | B01L 9/00 | 211/74 |
| 4,106,736 A * | 8/1978 | Becker, III | A47F 5/01 | 211/103 |
| D274,201 S * | 6/1984 | Aaron | D6/525 | |
| 4,807,567 A * | 2/1989 | Atchley | A01K 7/06 | 119/477 |
| 4,832,095 A * | 5/1989 | Bonnell | B65D 71/502 | 141/106 |
| 4,909,401 A * | 3/1990 | McConnell | A47J 47/16 | 211/41.8 |
| 5,014,860 A * | 5/1991 | Emery | A47K 3/281 | 211/106 |
| 5,180,067 A * | 1/1993 | Conaway | A47K 3/281 | 211/119 |
| 5,255,401 A * | 10/1993 | Sambrookes | A47K 3/281 | 206/77.1 |
| 5,348,168 A * | 9/1994 | Emery | A47K 3/281 | 211/106 |
| D351,751 S * | 10/1994 | Brightbill | D6/525 | |
| 5,439,193 A * | 8/1995 | Coulter | B67D 3/0029 | 248/206.3 |
| 5,588,543 A * | 12/1996 | Finger | A47F 5/083 | 211/106 |
| 5,657,954 A * | 8/1997 | Emery | A47K 1/09 | 248/206.3 |
| D408,185 S * | 4/1999 | Hofman | D6/525 | |
| 6,047,932 A * | 4/2000 | Skvorecz | B65D 7/20 | 126/40 |
| 6,220,458 B1 * | 4/2001 | Falor | A47G 23/0241 | 211/74 |
| D444,013 S * | 6/2001 | Ferrer Beltrán | D6/537 | |
| 6,398,045 B1 * | 6/2002 | Chao | A47F 7/0028 | 211/181.1 |
| D495,213 S * | 8/2004 | Compagnucci | D7/601 | |
| 6,776,378 B1 * | 8/2004 | Yu | A47B 73/00 | 211/74 |
| D509,361 S * | 9/2005 | Suero, Jr. | D3/306 | |
| D564,271 S * | 3/2008 | Snider | A47K 3/281 D6/525 | |
| D564,816 S * | 3/2008 | Snider | A47K 3/281 D6/525 | |
| 7,415,996 B2 * | 8/2008 | Favreau | A47G 23/0241 | 141/364 |
| 7,469,792 B1 * | 12/2008 | Lin | A47B 73/002 | 211/74 |
| 7,478,642 B2 * | 1/2009 | Koch | A47L 15/505 | 134/135 |
| 7,520,397 B1 * | 4/2009 | Segale | A47B 81/04 | 211/106 |
| D622,990 S * | 9/2010 | Yang | D6/525 | |
| 7,802,766 B2 * | 9/2010 | Thompson | F16B 12/22 | 248/220.1 |
| D651,837 S * | 1/2012 | Yang | D6/525 | |
| 8,186,521 B2 * | 5/2012 | Yu | A47B 55/02 | 211/106 |
| D677,089 S * | 3/2013 | Tawil | D6/525 | |
| 8,408,405 B2 * | 4/2013 | Yang | A47B 57/26 | 108/108 |
| 8,752,715 B1 * | 6/2014 | Dimock | A47L 17/00 | 206/562 |
| 8,763,821 B2 * | 7/2014 | Yang | A47B 57/26 | 108/108 |
| 8,839,980 B2 * | 9/2014 | Baines | A47K 3/281 | 211/90.03 |
| D724,943 S | 3/2015 | Epstein | | |
| D724,944 S | 3/2015 | Epstein | | |
| D734,668 S | 7/2015 | Epstein | | |
| D755,627 S | 5/2016 | Epstein | | |
| D769,641 S * | 10/2016 | Yang | D6/525 | |
| 9,883,742 B2 * | 2/2018 | Yang | A47K 1/09 | |
| D824,189 S * | 7/2018 | Yang | D6/525 | |
| 10,064,523 B2 * | 9/2018 | Engell | A47K 5/03 | |
| 2006/0043035 A1 * | 3/2006 | Madsen | A47B 73/004 | 211/74 |
| 2006/0151408 A1 * | 7/2006 | Gaynor | A47F 7/0028 | 211/74 |
| 2007/0221806 A1 * | 9/2007 | Mehta | A47G 23/0241 | 248/311.2 |
| 2011/0163054 A1 * | 7/2011 | Yu | A47B 55/02 | 211/94.02 |
| 2013/0026118 A1 * | 1/2013 | De Lourdes Mireles | A47G 23/0241 | 211/74 |
| 2013/0313212 A1 * | 11/2013 | Lindo | A47K 3/281 | 211/119.011 |
| 2014/0246392 A1 * | 9/2014 | McClain | A47G 23/02 | 211/85 |
| 2015/0027504 A1 * | 1/2015 | Milroy | B08B 9/28 | 134/169 R |

\* cited by examiner

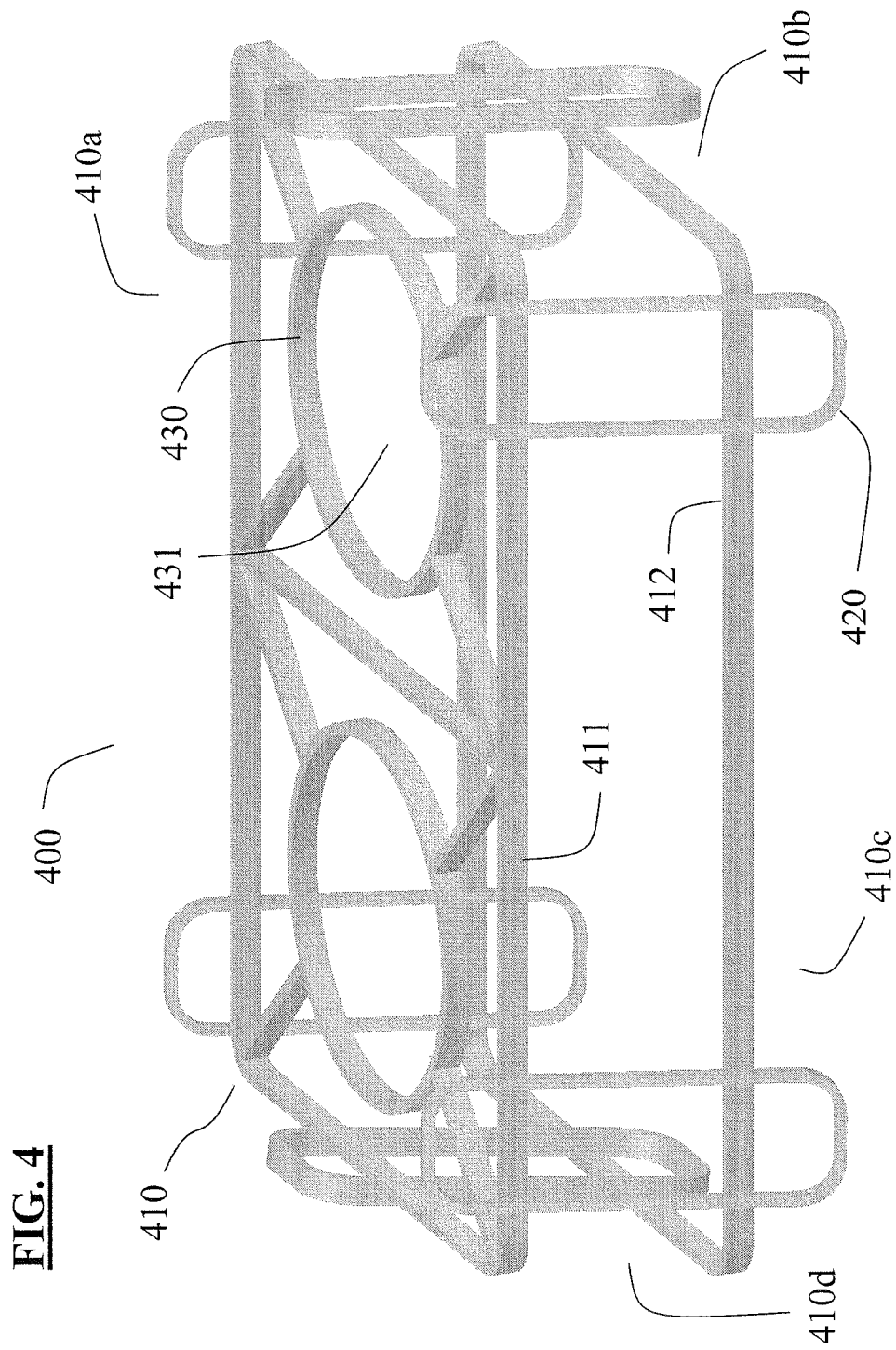

STAND FOR HOLDING BOTTLES UPSIDE DOWN

FIELD OF THE INVENTION

The present invention relates to a novel apparatus for holding containers in an inverted position. More particularly, embodiments of the present invention pertain to stands which hold bottles upside down, letting the contents of the bottle settle near the bottle opening, allowing consumption of the entirety of the contents of the bottle.

DISCUSSION OF THE BACKGROUND

Many products are packaged in bottles which are designed to stand with the opening at the top of the bottle, but cannot stand stably if turned upside down. Condiments, hair care products, skin care products, lubricants, cleaning products, and many other products are packaged in this manner. As the bottle sits in an upright position, the product settles at the bottom of the bottle. When the product runs low, a user must turn the bottle upside down and shake it in order to coax the remaining product out of the opening. Even then, a substantial amount of product often remains stuck to the sides and bottom of the bottle and gets thrown away when it becomes too cumbersome to continue trying to shake more of the product out. The cumulative effect of such waste is expensive for the consumer, and takes a toll on the environment in a time of increased awareness of one's carbon footprint and better conservation of food and other products.

To combat this waste, one current system includes replacement lids or caps which, when attached to the bottle, allow it to stand more stably upside down. Such lids require a specific threading or lid size in order to fit onto the opening of the bottle, and must be washed between uses, significantly limiting their utility. Other systems include stands which engage the bottle via bars which create a square opening, providing a poor fit for the majority of product bottles, and thus an unstable or leaky hold. Further, such stands often lack aesthetic appeal, reducing their utility in areas of a home which are visible to both residents and guests.

It is therefore desirable to provide methods and apparatus for holding containers with top openings in an inverted position so that their contents may be moved by gravity toward the opening in order to more fully utilize their contents and avoid waste.

SUMMARY OF THE INVENTION

The present invention relates to an improved apparatus and related methods for supporting product containers, such as bottles, in an inverted or upside-down position, allowing the content of the bottle to settle near the opening, reducing product waste. Embodiments of the present invention provide devices for holding product bottles upside down. Such devices may comprise a frame, at least one foot, and at least one bottle or container support. In some embodiments, the at least one foot may comprise a plurality of feet, and the at least one support may comprise a plurality of supports.

The supports may have a shape which is designed to fit the tops of many differently sized or shaped bottles or other containers, and the associated stands may include two or more bottle or container supports, allowing multiple bottles or containers of different shapes to be held upside down in the same stand. The associated frames may have a metallic shine and an aesthetically pleasing wire frame which adds to its versatility to be attractive in any setting in a home.

Different embodiments of the frame may have different shapes appropriate for different areas of the home. For example, and without limitation, a frame may have a triangular shape which fits into a corner of a bathtub to hold a shampoo and/or a conditioner bottle upside down. Not only does such a frame help to access all of the contents of a bottle in this situation, but it also stabilizes the container, preventing the shock of hearing a bottle which was set upside down on its own cap, leaning in a corner of the tub, from falling down and making a loud noise in the middle of the night. Other versions of frames of the present invention may have, without limitation, a rectangular shape which fits into a slot in a refrigerator door to hold, for example a ketchup or mustard bottle upside down; or an oval or circular shape which is attractive for a kitchen table to hold, for example, a hot sauce bottle upside down; or such frames may have a squared shape useful, for example, for a work bench or cupboard in order to hold lubricants or cleaning products upside down. Utilizing the stand to store products upside down will allow consumers to get the most out of their purchases, and contribute to conservation of resources and reduction of waste.

The frame of the present invention may comprise at least one of a wire frame and a solid frame. A frame may comprise at least one of a metal (e.g., steel, aluminum, copper, brass, a metal alloy, or other similar metal), a plastic material (e.g., polypropylene, polystyrene, polyvinyl chloride, high-density or low-density polyethylene, polyethylene terephthalate, or other similar plastic), a rubber material, wood, porcelain, and other similar rigid materials. In some embodiments, the frame may comprise a metal-infused plastic, providing a more durable and shiny surface while reducing weight in comparison to a pure metal.

The wire frame may comprise a plurality of interconnected layers in order to increase strength and resist deformation due to a downward compressive force from a heavy product bottle. In some embodiments, the plurality of interconnected layers may be oriented horizontally (e.g., stacked), with a plurality of vertically connecting wires.

In some embodiments, the frame may comprise three sides, forming a substantially triangular shape capable of fitting into a corner (e.g., a corner of a bathtub, counter, table, or refrigerator). In other embodiments, the frame may comprise four sides, forming a quadrilateral shape (e.g., a square, a rectangle, or a diamond shape). In yet other embodiments, the frame may comprise five or more sides. In some embodiments, the frame may comprise a single, curving side, forming a substantially circular shape (e.g., a carousel). In some embodiments, the frame may be operable to fit snugly into a slot of a refrigerator door. In some embodiments, the frame may taper from the top to the bottom, providing a substantially wider base, in order to increase stability of the device. It is to be appreciated that the above examples are a non-exhaustive list, and that further embodiments having other suitable shapes are also contemplated within the scope of the invention.

In some embodiments, the at least one foot may be integral to the frame. In other embodiments, the at least one foot may be secured to the frame via an adhesive. In some embodiments, the at least one foot may comprise a single foot, and may encompass the entire area beneath the frame (e.g., the bottom of a carousel). In other embodiments, the at least one foot may comprise three feet (e.g., wherein the frame comprises three sides, with one foot at each corner of the frame). In yet other embodiments, the at least one foot may comprise four feet (e.g., wherein the frame comprises four sides, with one foot at each corner of the frame). In some embodiments, the at least one foot may comprise five or more feet. It is to be appreciated that the above examples are a non-exhaustive list, and that further embodiments having other numbers of feet are also contemplated within the scope of the invention.

In some embodiments, the at least one foot may comprise at least one of a metal (e.g., steel, aluminum, copper, brass, a metal alloy, or other similar metal), a plastic material (e.g., polypropylene, polystyrene, polyvinyl chloride, high-density or low-density polyethylene, polyethylene terephthalate, or other similar plastic), a rubber material, wood, porcelain, and other similar materials. In some embodiments, the at least one foot may comprise the same material as the frame. In other embodiments, the at least one foot may comprise a different material than that of the frame, and be secured to the frame via an adhesive or via friction with a tight fit over a portion of the frame.

In some embodiments, the at least one foot may comprise a material which resists movement over a smooth surface (e.g., a rubber material which provides friction against a surface of a bathtub). In other embodiments, the at least one foot may comprise a material which slides easily over a smooth surface (e.g., a plastic or metal material which slides easily over the surface of a kitchen table in order to share condiments around the table). In yet other embodiments, the at least one foot may comprise a flat surface (e.g., a flange or tab) oriented parallel with the surface which supports the stand, the flat surface having a hole through which a fastening device can be passed in order to secure the stand in place on the surface supporting the stand (e.g., a nail or screw used to hold the stand in place on a work bench in a garage).

The supports of the present invention may comprise a shape which supports the shoulders of an upside-down bottle to prevent the head of the bottle from moving laterally. In some embodiments, the bottle support may comprise a substantially semi-spherical shape with its concave surface facing upward and having a hole at its center. The upper edge of the bottle support may comprise a plurality of raised, curving shoulders on opposite sides of the edge, allowing the shoulders (if any) of a product bottle to settle between the raised shoulders of the upper edge, thus preventing twisting of the bottle.

In some embodiments, a hole at the center of the bottle support may comprise an inner diameter sufficient to allow the head of the product bottle to pass at least partially through the hole and prevent the bottle from tipping over by providing a stop against lateral movement of the head of the bottle. In some embodiments, the hole may further comprise a raised lip running around the circumference of the hole, the raised lip comprising a shape which increases friction between the lip and the head of the bottle. The lip may thus be able to prevent the head of the bottle from sliding upward against the lip, reducing the likelihood that a bottle will fall out of the stand if the bottle begins to tip over. In embodiments wherein the stand fits into the slot of a refrigerator door, the at least one bottle support may comprise a ring shape with a large hole in its center, allowing some bottles to reach down to the upper surface of the slot of the refrigerator. Some embodiments may be provided with a hook or other securing device for attaching the container support to an adjacent shelf or other structure.

The at least one bottle support may be located substantially centrally within the top side of the frame. In embodiments of the present invention comprising a wire frame, the bottle support may be connected to at least one side of the frame via a plurality of horizontal wires. In embodiments of the present invention comprising a solid frame, the bottle support may be connected to a top surface of the frame (e.g., secured within a hole in the upper surface of the frame).

In some embodiments, the at least one bottle support may comprise a plurality of bottle supports, the plurality of bottle supports being arranged so as to allow a plurality of bottles to be held upside down in the stand. In some embodiments, the plurality of bottle supports may be substantially evenly distributed over the upper surface of the frame. In some embodiments, the plurality of bottle supports may comprise a first bottle support and a second bottle support, the first bottle support comprising a larger inner diameter than the second bottle support in order, providing a stable fit for bottles with large caps and/or wide shoulders.

In some embodiments, the at least one bottle support may comprise at least one of a metal (e.g., steel, aluminum, copper, brass, a metal alloy, or other similar metal), a plastic material (e.g., polypropylene, polystyrene, polyvinyl chloride, high-density or low-density polyethylene, polyethylene terephthalate, or other similar plastic), a rubber material, wood, porcelain, and other similar materials. In some embodiments, the at least one bottle support may comprise the same material as the frame. In other embodiments, the at least one bottle support may comprise a different material than that of the frame, and be secured to the frame via an adhesive or via friction with a tight fit over a portion of the frame.

In some embodiments, the at least one bottle support may comprise a material which resists movement by a smooth surface (e.g., a rubber material which provides friction against the head and/or shoulders of a bottle). In some embodiments, only the lip of the hole of the bottle support may comprise a material which resists movement, and the remainder of the semi-sphere may comprise a smoother material (e.g., metal or plastic). In other embodiments, the bottle support may further comprise an insert which covers the concave surface of the bottle support, the insert comprising a material which resists movement of a smooth surface, while the remainder of the bottle support comprises a smoother material (e.g., metal or plastic).

It is an object of the present invention to provide a stand capable of holding bottles or other containers of a variety of shapes and sizes in a stable upside-down position.

It is also an object of the present invention to provide a stand which allows a consumer to utilize virtually all of the product in a bottle or other containers, reducing waste and conserving resources.

It is also an object of the present invention to provide a stand with a shape which prevents bottles or other containers from falling out of the stand due to tipping over.

It is also an object of the present invention to provide a stand which can hold multiple bottles or other containers at once.

It is also an object of the present invention to provide a stand which is aesthetically pleasing, increasing versatility in being appropriate for any area of the home.

Additional aspects and objects of the invention will be apparent from the detailed descriptions and the claims herein.

BRIEF DESCRIPTION OF THE DRAWINGS

FIG. 4 provides a perspective view of a stand for holding bottles upside down, according to an embodiment of the present invention.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Figure 1A:
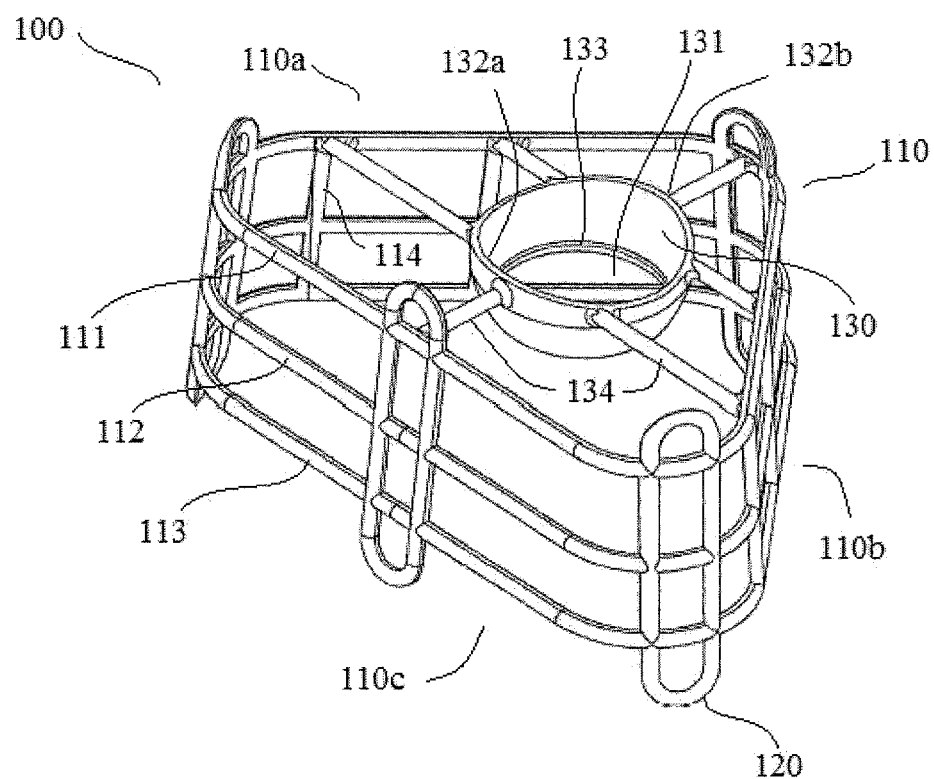
FIG. 1a provides a perspective view of a stand for holding bottles upside down, according to an embodiment of the present invention.
Figure 1B:
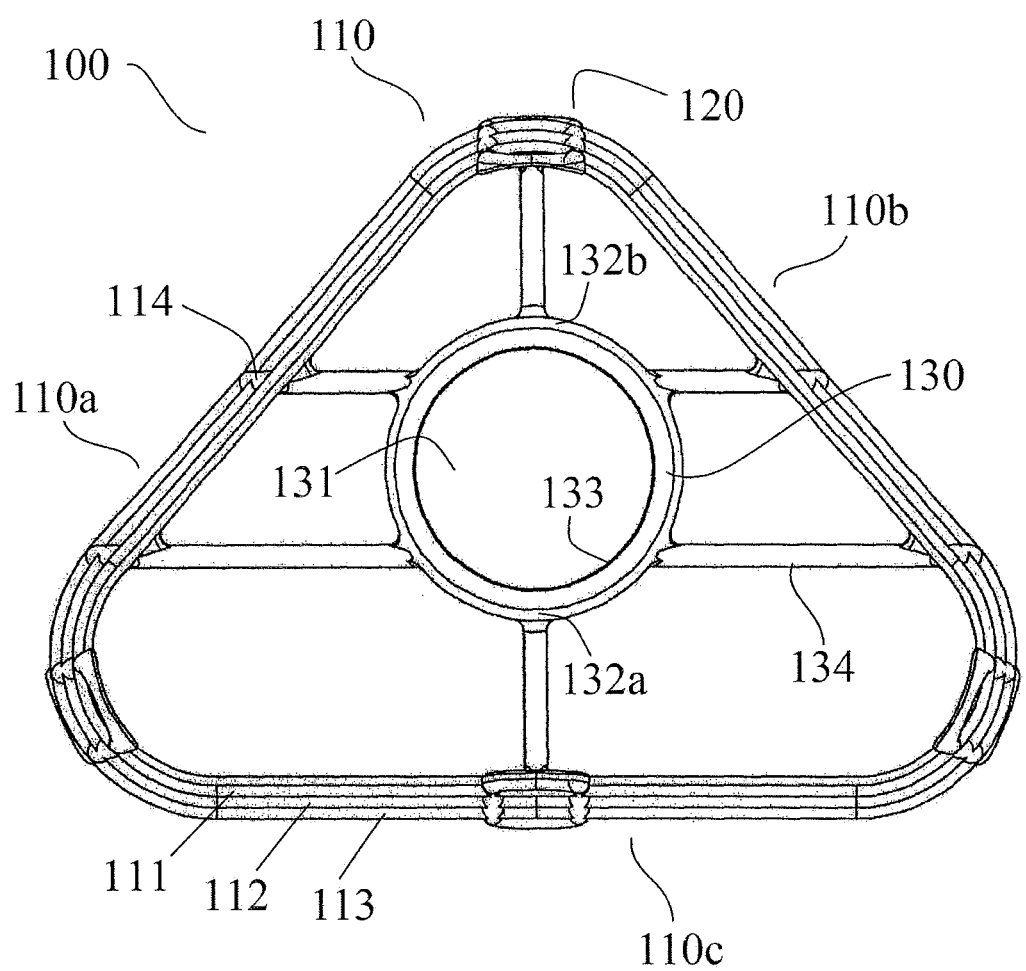
FIG. 1b provides a top-down view of a stand for holding bottles upside down, according to an embodiment of the present invention.
Figure 1C:
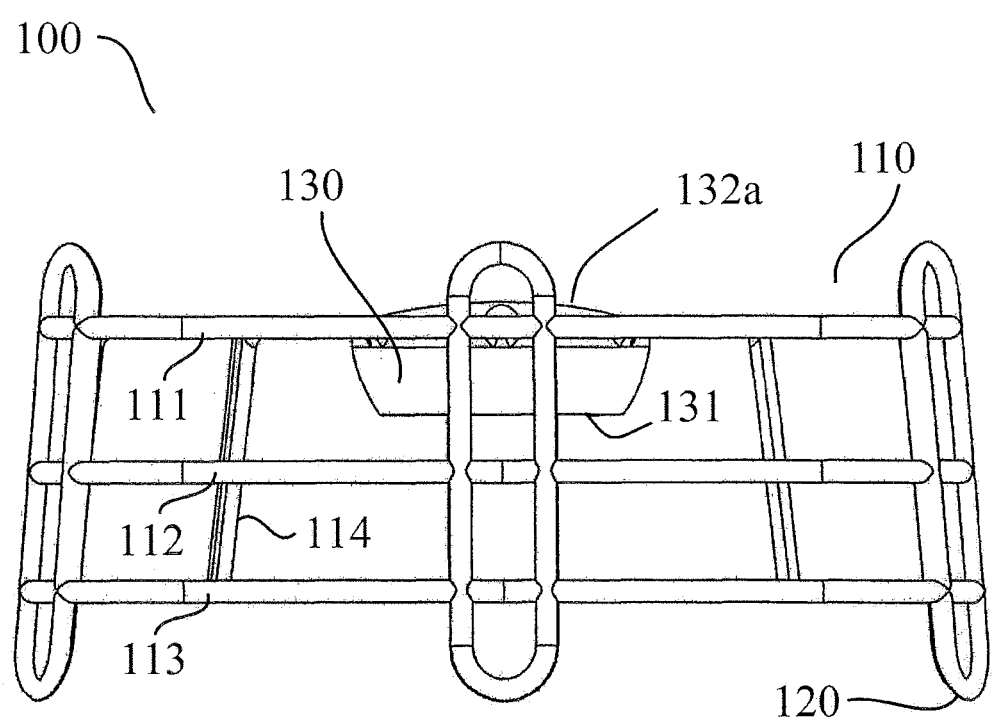
FIG. 1c provides a side view of a stand for holding bottles upside down, according to an embodiment of the present invention.
Figure 1D:
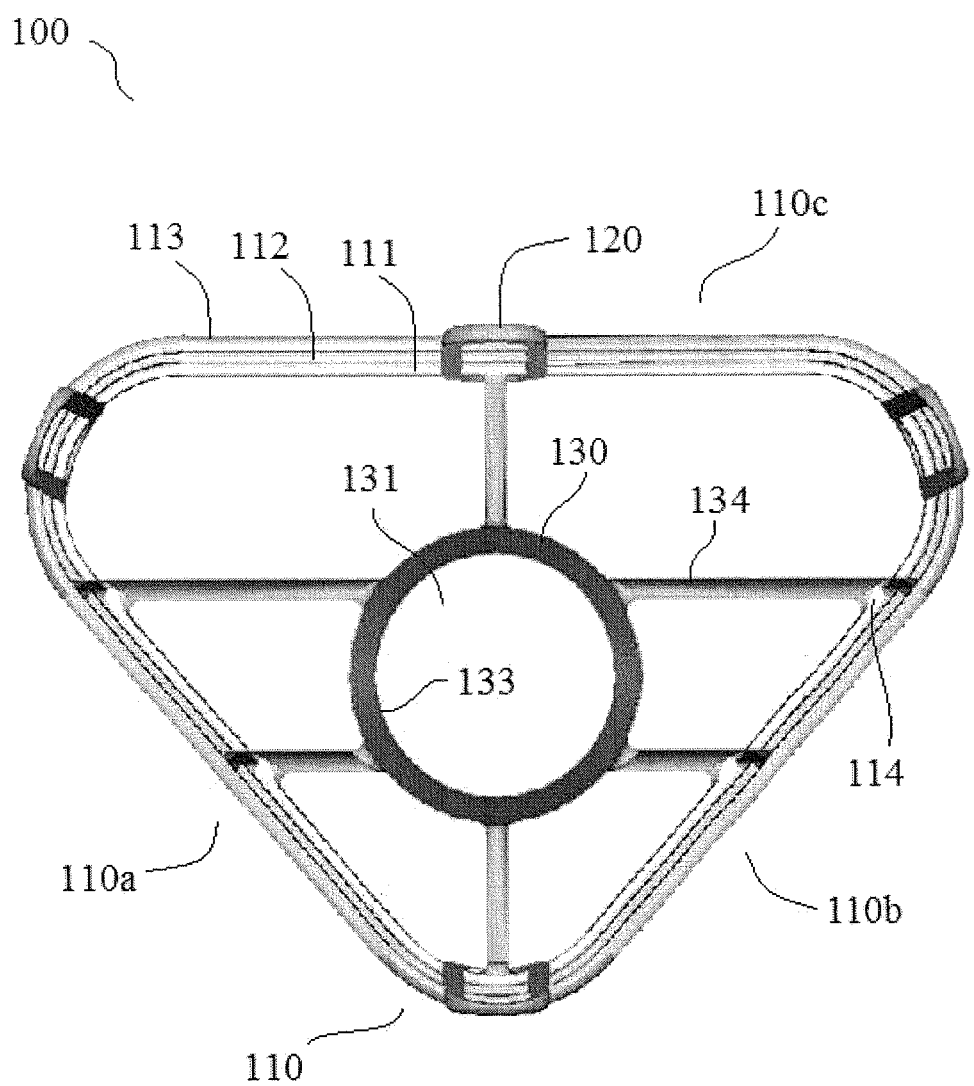
FIG. 1d provides a bottom-up view of a stand for holding bottles upside down, according to an embodiment of the present invention.
Figure 2A:
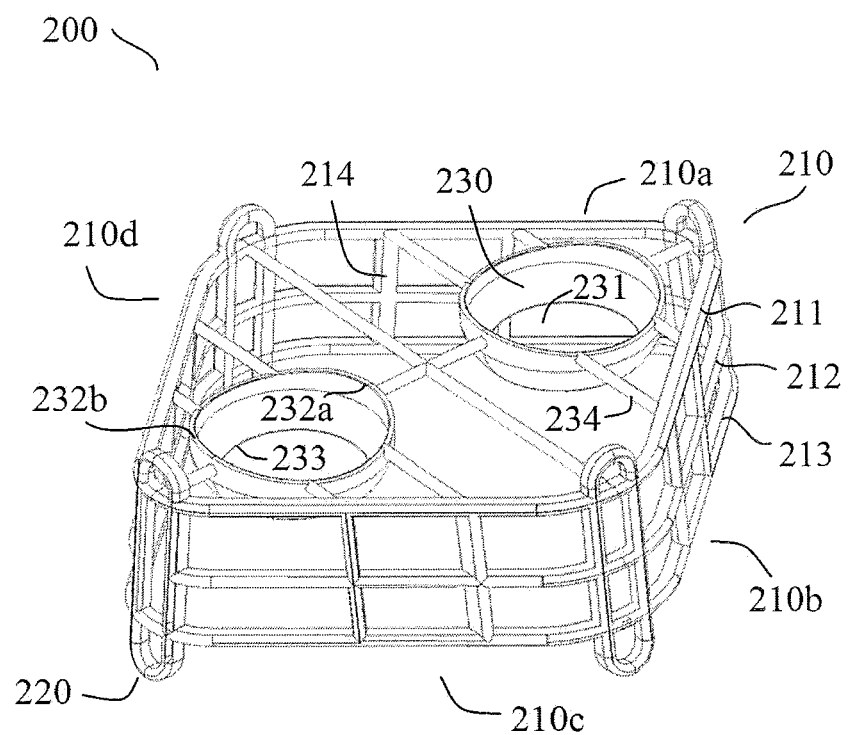
FIG. 2a provides a perspective view of a stand for holding bottles upside down, according to an embodiment of the present invention.
Figure 2B:
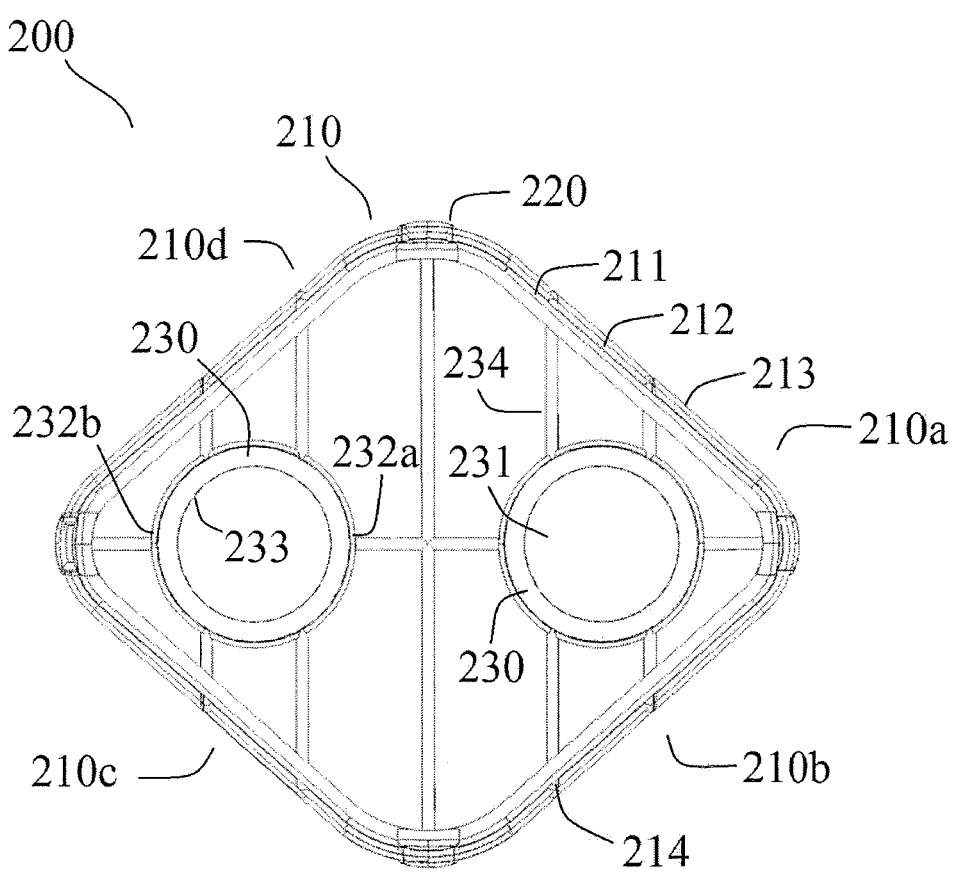
FIG. 2b provides a top-down view of a stand for holding bottles upside down, according to an embodiment of the present invention.
Figure 2C:
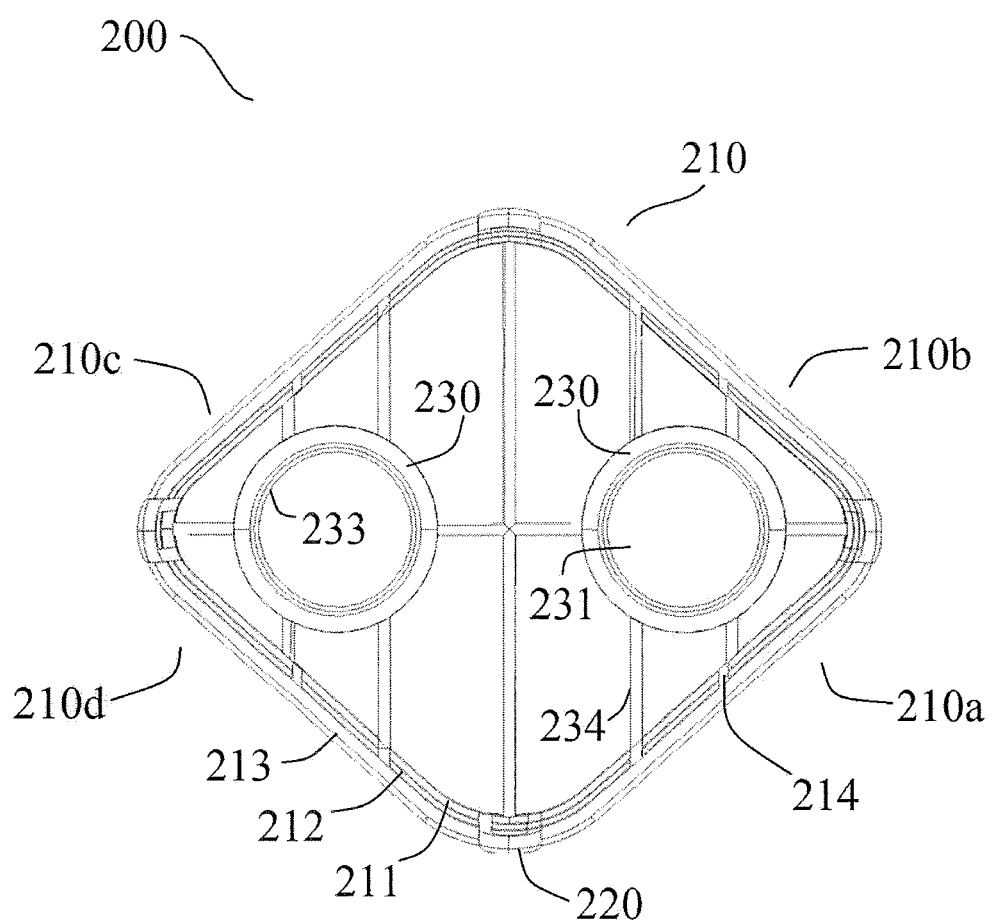
FIG. 2c provides a bottom-up view of a stand for holding bottles upside down, according to an embodiment of the present invention.
Figure 2D:
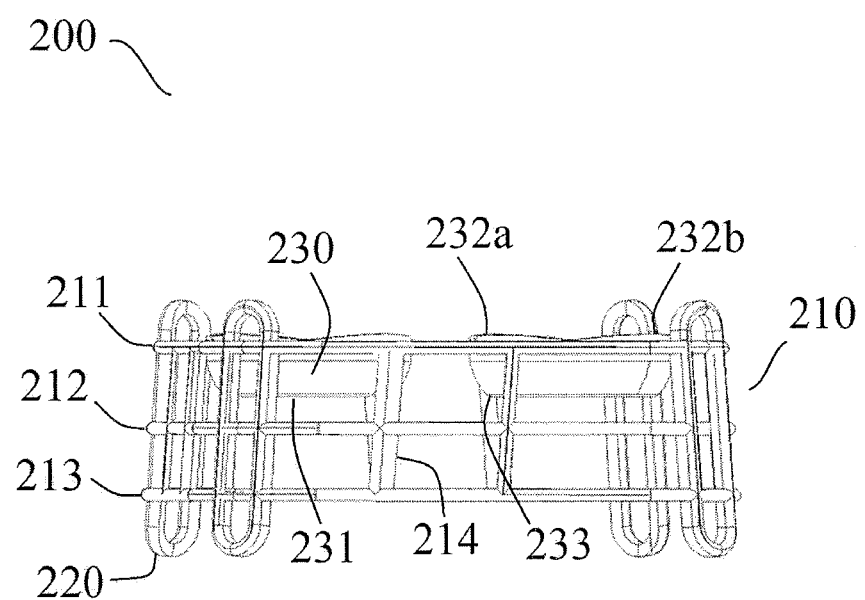
FIG. 2d provides a side view of a stand for holding bottles upside down, according to an embodiment of the present invention.
Figure 3A:
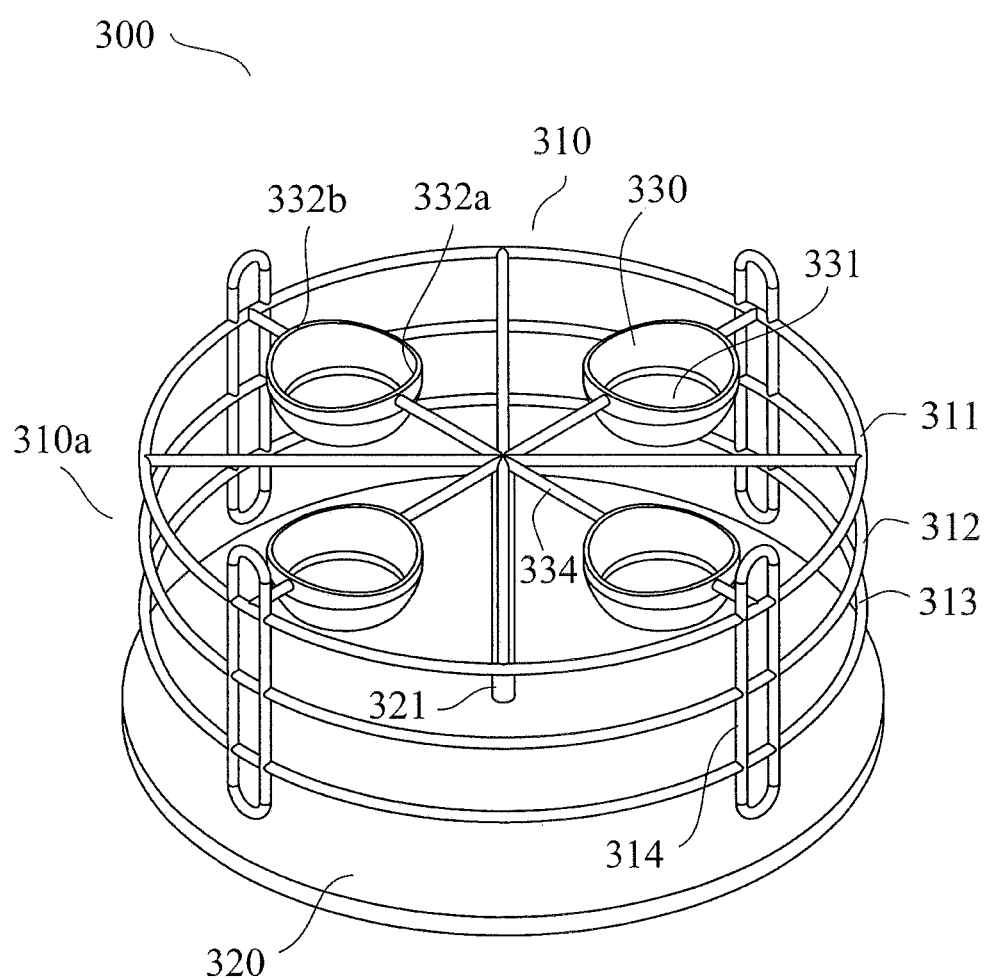
FIG. 3a provides a perspective view of a stand for holding bottles upside down, according to an embodiment of the present invention.
Figure 3B:
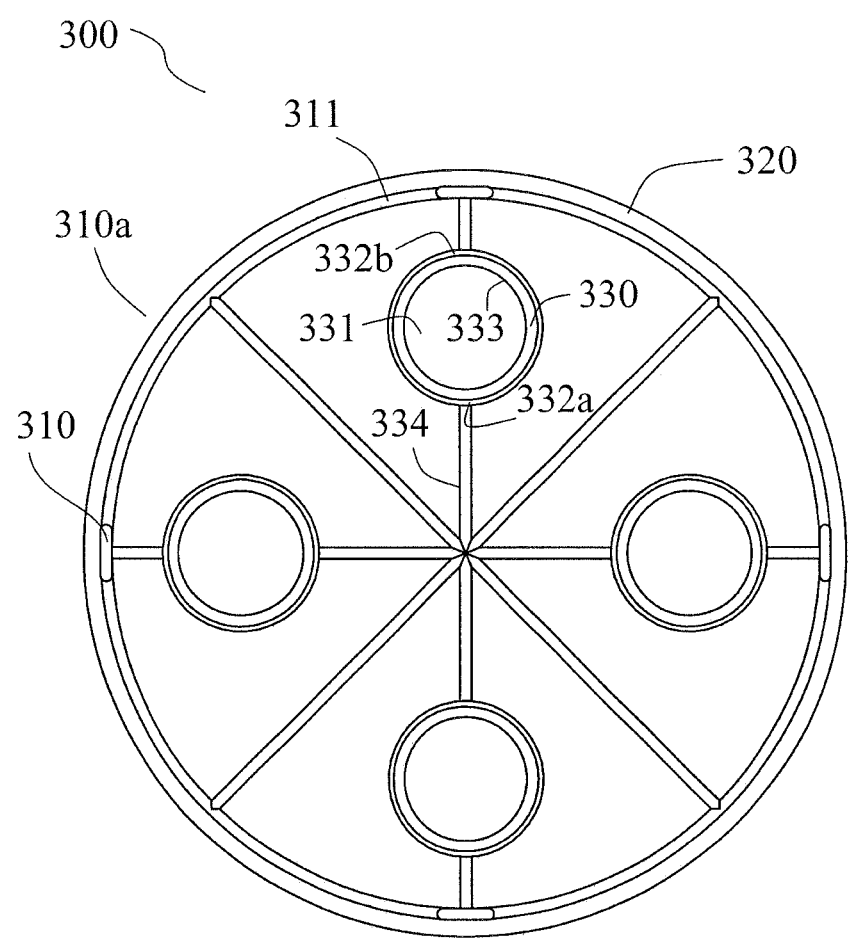
FIG. 3b provides a top-down view of a stand for holding bottles upside down, according to an embodiment of the present invention.
Figure 3C:
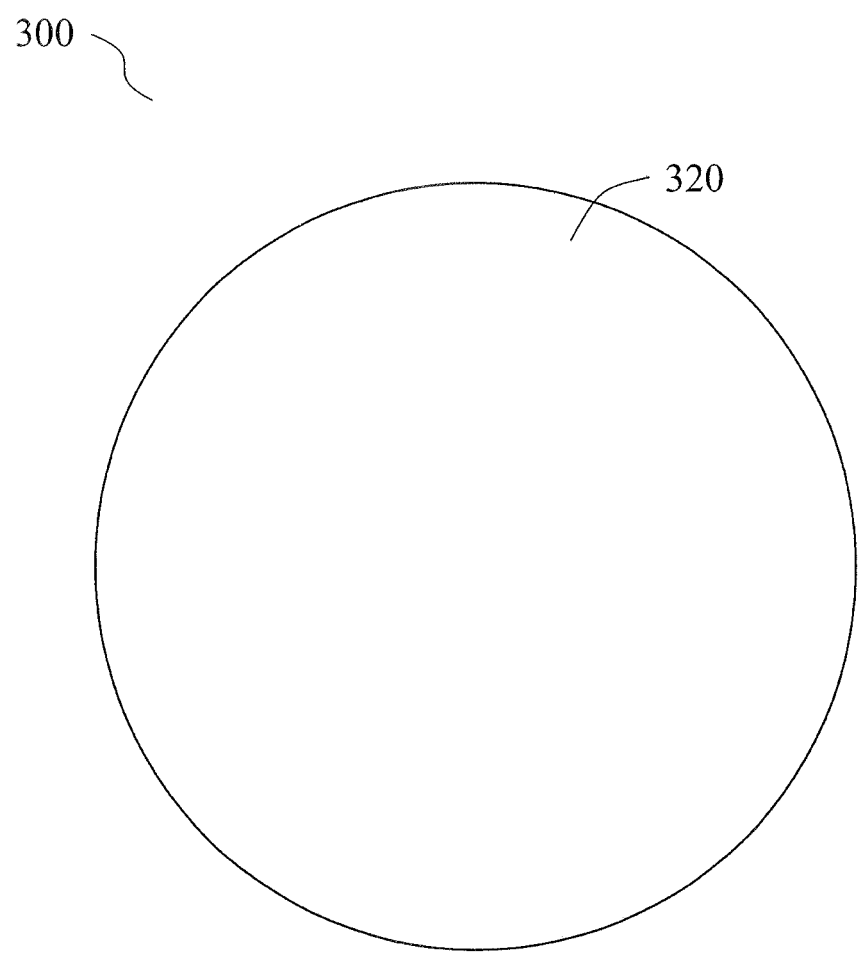
FIG. 3c provides a bottom-up view of a stand for holding bottles upside down, according to an embodiment of the present invention.
Figure 3D:
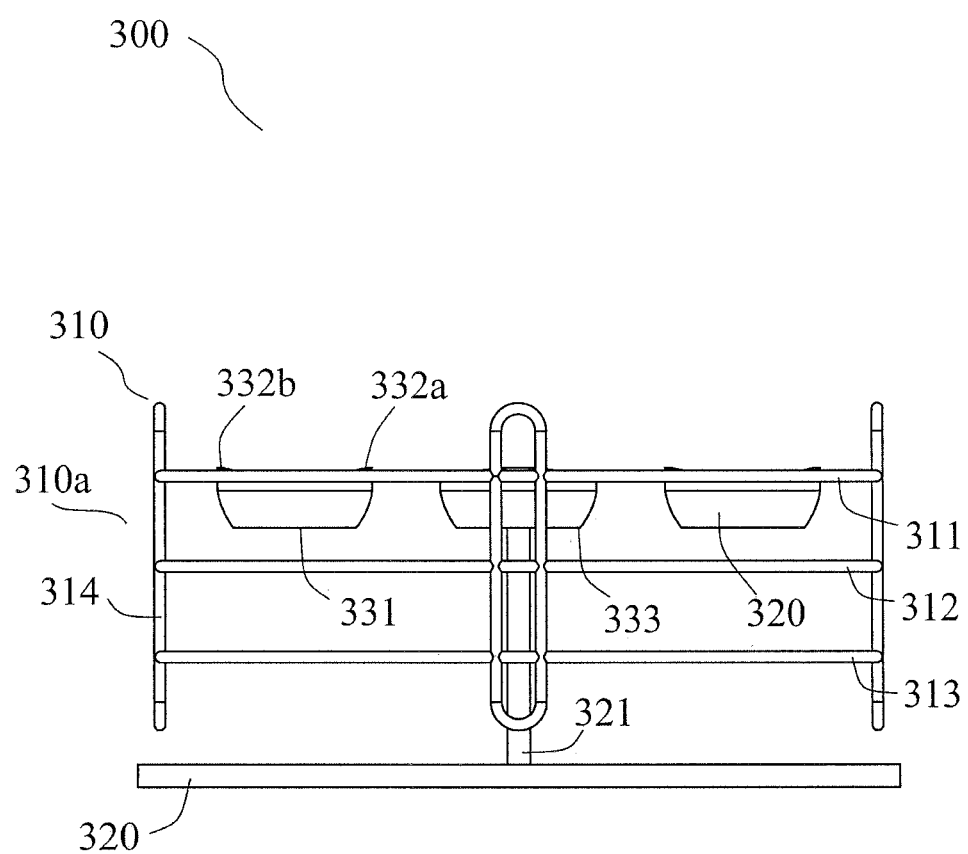
FIG. 3d provides a side view of a stand for holding bottles upside down, according to an embodiment of the present invention.

Referring to the drawings wherein like reference characters designate like or corresponding parts throughout the several views, and referring to FIGS. 1-4, it is seen that the present invention includes various embodiments of a stand for holding bottles upside down.

The present invention relates to an improved device for supporting product bottles upside down, allowing the content of the bottle to settle near the opening, reducing product waste. The device may include a stand for holding product bottles upside down, preventing bottles from tipping over, and allowing the consumer to utilize all of the product in the bottle. The device may comprise a frame, at least one foot, and at least one bottle support. In some embodiments, the at least one foot may comprise a plurality of feet, and the at least one bottle support may comprise a plurality of bottle supports.

FIGS. 1a-1d provide a perspective view, a top-down view, and a side view, and a bottom-up view, respectively, of a stand 100 for holding a bottle upside down, according to an embodiment of the present invention. The stand 100 may comprise a frame 110, a plurality of feet 120, and a bottle support 130.

The frame 110 may be a wire frame comprising a plurality of interconnected layers 111-113 in order to increase strength and resist deformation due to a downward compressive force from a heavy product bottle. The plurality of interconnected layers 111-113 may be oriented horizontally (e.g., stacked), with a plurality of vertical connecting wires 114. The frame may comprise three horizontal-facing sides 110a-110c, forming a substantially triangular shape capable of fitting into a corner (e.g., a corner of a bathtub) and may comprise a taper from the top of the frame 110 to the bottom of the frame 110, providing a substantially wider base, in order to increase stability of the stand 100.

The plurality of feet 120 may be integral to the frame 110 and may comprise the same material as the frame 110 (e.g., steel, aluminum, copper, brass, a metal alloy, or other similar metal), a plastic material (e.g., polypropylene, polystyrene, polyvinyl chloride, high-density or low-density polyethylene, polyethylene terephthalate, or other similar plastic), a rubber material, wood, porcelain, and other similar materials. In other embodiments, the plurality of feet 120 may comprise a different material than that of the frame 110, and be secured to the frame via an adhesive or via friction with a tight fit over a portion of the frame 110. In some embodiments, the plurality of feet 120 may comprise a material which resists movement over a smooth surface (e.g., a rubber material which provides friction against a surface of a bathtub). In other embodiments, the plurality of feet may comprise a material which slides easily over a smooth surface (e.g., a plastic or metal material which slides easily over a kitchen table).

The at least one bottle support 130 may comprise a substantially semi-spherical shape with its concave surface facing upward and having a hole 131 at its center. The upper edge of the bottle support may comprise two raised, curving shoulders 132a, 132b on opposite sides of the bottle support 130 which allow the shoulders of a product bottle to settle between the raised shoulders 132a, 132b, preventing twisting of the bottle.

The hole 131 at the center of the bottle support 130 may comprise an inner diameter sufficient to allow the head of the product bottle to pass at least partially through the hole 131, preventing the bottle from tipping over by providing a stop against lateral movement of the head of the bottle. The hole 131 may further comprise a raised lip 133 running around the circumference of the hole 131, the raised lip 133 comprising a shape which increases friction between the lip 133 and the head of the bottle. The lip 133 may thus prevent the head of the bottle from sliding upward against the lip 133, reducing the likelihood that a bottle will fall out of the stand 100 if the bottle begins to tip over.

The at least one bottle support 130 may be located substantially centrally within the top side of the frame 110, being connected to at least one of the horizontal facing sides 110a-110c of the frame via a plurality of horizontal wires 134. In some embodiments, the at least one bottle support 130 may comprise the same material as that of the frame 110 (e.g., steel, aluminum, copper, brass, a metal alloy, or other similar metal), a plastic material (e.g., polypropylene, polystyrene, polyvinyl chloride, high-density or low-density polyethylene, polyethylene terephthalate, or other similar plastic), a rubber material, wood, porcelain, and other similar materials. In other embodiments, the at least one bottle support 130 may comprise a different material than that of the frame 110.

In some embodiments, the at least one bottle support 130 may comprise a material which resists movement by a smooth surface (e.g., a rubber material which provides friction against the head and/or shoulders of a bottle). In some embodiments, only the lip 133 may comprise a material which resists movement, and the remainder of the bottle support 130 may comprise a smoother material (e.g., metal or plastic).

FIGS. 2a-2d provide a perspective view, a top-down view, a bottom-up view, and a side view, respectively, of a stand 200 for holding bottles upside down, according to an embodiment of the present invention. The stand 200 may comprise a frame 210, a plurality of feet 220, and a plurality of bottle supports 230.

The frame 210 may be a wire frame comprising a plurality of interconnected layers 211-213, oriented horizontally and connected by vertical connecting wires 214, in order to increase strength and resist deformation due to a downward compressive force from a heavy product bottle. The frame may comprise four horizontal-facing sides 210a-210d, forming a substantially diamond shape, and may comprise a taper from to the bottom, providing a substantially wider base, in order to increase stability of the stand 200.

The plurality of feet 220 may be integral to the frame 210 and may comprise the same material as the frame 210.

The plurality of bottle supports 230 may comprise two substantially similar bottle supports arranged so as to allow two bottles to be held upside down in the stand 200 at the same time. Each bottle support of the plurality of bottle supports 230 may comprise a substantially semi-spherical shape with its concave surface facing upward and having a hole 231 at its center. The upper edge of each bottle support 230 may comprise two raised, curving shoulders 232a, 232b on opposite sides of the bottle support 230 which allow the shoulders of a product bottle to settle between the raised shoulders 232a, 232b, preventing twisting of the bottle.

The hole 231 at the center of each bottle support 230 may comprise an inner diameter sufficient to allow the head of the product bottle to pass at least partially through the hole 231, preventing the bottle from tipping over by providing a stop against lateral movement of the head of the bottle. Each hole 231 may further comprise a raised lip 233 running around the circumference of the hole 231, the raised lip 233 comprising a shape which increases friction between the lip 233 and the head of the bottle.

The plurality of bottle supports 230 may be located within the top side of the frame 210, being connected to at least one of the horizontal facing sides 210a-210d of the frame via a plurality of horizontal wires 234.

FIGS. 3a-3d provide a perspective view, a top-down view, a bottom-up view, and a side view, respectively, of a stand 300 for holding bottles upside down, according to an embodiment of the present invention. The stand 300 may comprise a frame 310, a foot 320, and a plurality of bottle supports 330.

The frame 310 may be a wire frame comprising a plurality of interconnected layers 311-313 in order to increase strength and resist deformation due to a downward compressive force from a heavy product bottle. The plurality of interconnected layers 311-313 may be oriented horizontally (e.g., stacked), with a plurality of vertical connecting wires 314. The frame 310 may comprise a single, curving side 310a, forming a substantially circular shape (e.g., a carousel).

The foot 320 may comprise a disk shape with a diameter at least equal to an outer diameter of the circular frame 310, and may be connected to the frame 310 via at least a central post 321. The foot 320 may comprise the same material as the frame 310. In some embodiments, the foot 320 may comprise a material which resists movement over a smooth surface (e.g., a rubber material which provides friction against a surface of a counter or table). In other embodiments, the foot 320 may comprise a material which slides easily over a smooth surface (e.g., a plastic or metal material which slides easily over a counter or table). In some embodiments, the foot 320 may comprise on an upper surface the same material as that of the frame 310, and on a lower surface may comprise a material which resists movement over a smooth surface.

The plurality of bottle supports 330 may comprise four substantially similar bottle supports arranged circumferentially evenly around the central post 321, allowing up to four bottles to be held stably upside down in the stand 300 at the same time. Each bottle support of the plurality of bottle supports 330 may comprise a substantially semi-spherical shape with its concave surface facing upward and having a hole 331 at its center. The upper edge of each bottle support 330 may comprise two raised, curving shoulders 332a, 332b on opposite sides of the bottle support 230 which allow the shoulders of a product bottle to settle between the raised shoulders 232a, 232b, preventing twisting of the bottle.

The hole 331 at the center of each bottle support 330 may comprise an inner diameter sufficient to allow the head of the product bottle to pass at least partially through the hole 331, preventing the bottle from tipping over by providing a stop against lateral movement of the head of the bottle. Each hole 331 may further comprise a raised lip 333 running around the circumference of the hole 331, the raised lip 333 comprising a shape which increases friction between the lip 333 and the head of the bottle.

The plurality of bottle supports 330 may be located within the top side of the frame 310, being connected to the horizontal facing sides 310a of the frame via a plurality of horizontal wires 334.

FIG. 4 provides a perspective view of a stand 400 for holding bottles upside down, according to an embodiment of the present invention. The stand 400 may comprise a frame 410, a plurality of feet 420, and a plurality of bottle supports 430.

The frame 410 may be a wire frame comprising a plurality of interconnected layers 411, 412 oriented horizontally and connected by vertical connecting wires 414, in order to increase strength and resist deformation due to a downward compressive force from a heavy product bottle. The frame may comprise four horizontal-facing sides 410a-410d, forming a rectangular shape which may fit into the slot of a refrigerator door.

The plurality of feet 420 may be integral to the frame 410 and may comprise the same material as the frame 410.

The plurality of bottle supports 430 may comprise two substantially similar bottle supports arranged so as to allow two bottles to be held upside down in the stand 400 at the same time. Each bottle support of the plurality of bottle supports 430 may comprise a ring shape with a large hole 431 at its center, the hole 431 comprising an inner diameter sufficient to allow the head of the product bottle to pass at least partially through the hole 431, preventing the bottle from tipping over by providing a stop against lateral movement of the head of the bottle. The plurality of bottle supports 430 may be located within the top side of the frame 410, being connected to at least one of the horizontal facing sides 410a-410d of the frame via a plurality of horizontal wires 434.

It should be understood that the foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, and to thereby enable others skilled in the art to best utilize the invention and various embodiments with various modifications as are suited to the particular use contemplated.

What is claimed:

1. A device for holding a bottle upside down, comprising:
   a. a rigid wire frame comprising a metal-infused plastic, said frame having a plurality of horizontal interconnected layers for increasing the strength of the frame and collectively supporting the weight of said bottle, said plurality of horizontal interconnected layers being connected to each other via a plurality of substantially vertical connecting wires;
   b. at least one foot; and
   c. at least one bottle support comprising a substantially semi-spherical shape having a concave surface, and an upper edge having a plurality of raised, curving shoulders for contacting said bottle.

2. The device of claim 1, wherein said frame comprises a triangular shape capable of fitting into a corner.

3. The device of claim 1, wherein said frame comprises a substantially rectangular cubic shape which fits into a slot of a refrigerator door.

4. The device of claim 1, wherein said at least one foot comprises a material which resists movement over a smooth surface.

5. The device of claim 1, wherein said at least one foot is integral to said frame.

6. The device of claim 1, wherein said at least one foot comprises a tab for securing said device to a supporting surface via a fastening device.

7. The device of claim 1, wherein said at least one bottle support comprises a hole at its center, said hole comprising a raised lip for contacting said bottle.

8. The device of claim 7, further comprising an insert which fits into said at least one bottle support, said insert comprising a concave surface and a material which resists movement over a smooth surface.

9. The device of claim 7, wherein said at least one bottle support comprises a plurality of bottle supports.

10. The device of claim 1, wherein said rigid wire frame does not extend above a shoulder of said bottle.

11. The device of claim 1, wherein said bottle comprises at least one shoulder, and said frame does not extend above said shoulder for the purpose of supporting said bottle in a vertical position.

12. The device of claim 7, wherein said plurality of raised, curving shoulders prevent said bottle from twisting while supported by said bottle support.

* * * * *